(12) United States Patent  (10) Patent No.: US 7,318,358 B2
Kistler  (45) Date of Patent: Jan. 15, 2008

(54) STRAIN SENSOR THAT COMPENSATES FOR THERMAL STRAIN

(76) Inventor: Walter P. Kistler, 11423 Red-Wood Rd., Redmond, WA (US) 98052

( * ) Notice: Subject to any disclaimer, the term of this patent is extended or adjusted under 35 U.S.C. 154(b) by 44 days.

(21) Appl. No.: 11/098,027

(22) Filed: Apr. 1, 2005

(65) Prior Publication Data

US 2006/0219028 A1  Oct. 5, 2006

(51) Int. Cl.
G01L 1/04 (2006.01)
G01G 3/14 (2006.01)

(52) U.S. Cl. ............... 73/862.045; 73/862.041; 177/211

(58) Field of Classification Search ......... 73/862.044, 73/862.045, 862.621, 862.622, 862.623, 73/862.627, 862.041, 862.042, 862.043, 73/862.046, 862.471, 862.473, 862.474; 177/211
See application file for complete search history.

(56) References Cited

U.S. PATENT DOCUMENTS 3,693,425 A * 9/1972 Starita et al. .......... 73/862.044
3,960,013 A * 6/1976 Ormond .................. 177/211
4,064,744 A 12/1977 Kistler .................... 73/88.5
4,166,997 A 9/1979 Kistler .................... 338/5
4,448,083 A * 5/1984 Hayashi ............... 73/862.042
4,454,770 A 6/1984 Kistler ................. 73/862.65
4,522,066 A 6/1985 Kistler et al. ............ 73/781
4,596,155 A 6/1986 Kistler ................. 73/862.65
4,766,666 A * 8/1988 Sugiyama et al. ........ 29/621.1
4,996,882 A 3/1991 Kistler .................. 73/777
5,313,022 A 5/1994 Piroozmandi et al. ..... 177/211
5,734,110 A 3/1998 Kosmal .................. 73/766
5,770,823 A 6/1998 Piroozmandi ............ 177/1
5,777,234 A 7/1998 Kosmal .................. 73/765
6,555,765 B2 * 4/2003 Paine ..................... 177/142
2003/0042050 A1 * 3/2003 Stimpson ................. 177/132

* cited by examiner

Primary Examiner—Harshad Patel
Assistant Examiner—Punam Patel
(74) Attorney, Agent, or Firm—Dorsey & Whitney LLP (57) ABSTRACT

A strain sensor includes a sensor body extending substantially in a plane. The sensor body is substantially symmetric in the plane about a first axis and a second axis that is perpendicular to the first axis. The sensor body includes a plurality of sensor body portions symmetrically spaced apart about the first axis and the second axis with the plurality of sensor body portions interconnected by respective beams. The strain sensor further includes at least one strain sensing element mounted on one of the respective beams.

28 Claims, 6 Drawing Sheets

STRAIN SENSOR THAT COMPENSATES FOR THERMAL STRAIN

TECHNICAL FIELD

This invention relates to strain sensors for sensing strains in structures and, more particularly, to bolt-on strain sensors that compensate for thermal strains.

BACKGROUND OF THE INVENTION

Several methods and technologies have been developed for measuring the contents of large silos or bins used to store bulk materials such as minerals, coal, plastics, chemicals, and grains. One conventional method for measuring the amount of goods stored in large silos involves weighing the contents of the vessels. However, this method becomes difficult and impractical when the contents are stored in large, tall silos or other similarly large vessels.

Another conventional approach for measuring the amount of goods stored in large silos involves bolting strain sensors to the support structure of the silos. The contents of a vessel may be determined by monitoring the electrical output that is the direct result of strain measurements taken from one or more strain sensors coupled to the support structure of the vessel. By measuring the amount of axial strain in the support structure as material is added or removed from the vessel, the weight of the contents can be determined.

Conventional bolt-on strain sensors can be adversely affected by variations in the temperature of the support structure and/or the sensor itself. Even if a strain sensor is stable over a large range of temperatures that is commonly experienced if used outside, the strain sensor can still be susceptible to differences in temperature between the strain sensor and the support structure to which it is mounted. Fast temperature changes that can occur under variable solar irradiation can cause considerable measurement errors due to the temperature difference between the strain sensor and the support structure. For example, installing a single axis strain sensor on a silo support structure so that the strain sensor is sensitive in the direction of the principal strain will provide information about the weight or level of material in the silo. This information will be in the form of an electrical output proportional to the stress change in the support structure. However, the sensor will also measure and provide an electrical output of the strain related to thermal changes, i.e., the expansion/contraction of the support structure independent of the principal strain associated with a load change. Thus, the accuracy of bolt-on sensors can be affected by strains (expansion and contraction) induced by changes in the temperature of the support structure to which the sensor is bolted. The strain sensor is unable to discriminate between strains caused by loading or unloading of the support structure and thermal strains caused by changes in temperature.

One conventional approach for compensating for the measurement errors caused by temperature is to install a pair of bolt-on strain sensors on a support structure in a rosette pattern with the sensors arranged at right angles to each other. The electrical output of the vertical sensor is reversed as compared to the horizontal sensor so that, for example, the electrical output of the vertical sensor is positive for compression and negative for tension while the electrical output of the horizontal sensor is negative for compression and positive for tension. The vertical sensor is aligned with the principal strain so that the vertical sensor will be compressed when the load is increased. The horizontal sensor is at ninety degrees so that it will be tensioned in accordance with Poisson's ratio when the load is increased. The sensors are connected to each other so that the electrical output of the horizontal sensor is subtracted from the electrical output of the vertical sensor. For example, as a result of the sensors' orientation and electrical connections, increasing loads cause a voltage from the compressed vertical sensor to increase that is subtracted from the decreasing voltage generated by the tensioned horizontal sensor. Conversely, decreasing loads cause the voltage from the tensioned vertical sensor to decrease that is subtracted from the increased voltage generated by the compressed horizontal sensor. However, the vertical and horizontal sensors react equally to thermally induced strain. As a result, a decreasing temperature will compress both sensors causing the vertical sensor to generate an increasing voltage that is subtracted from the increasing voltage from the horizontal sensor. As a result, the combined voltage remains constant. Conversely, an increasing temperature will tension both sensors causing the vertical sensor to generate a decreasing voltage that is subtracted from the decreasing voltage of the horizontal sensor. Again, the combined voltage remains constant. Therefore, the rosette arrangement reduces measurement error caused by thermal effects.

One problem with using a pair of bolt-on strain sensors in a rosette pattern is that the sensors should be installed at precisely ninety degrees in relation to each other and as close to each other as possible so that they are both exposed to the same thermal changes. However, installing bolt-on strain sensors with the degree of precision required can be difficult. For example, installation requires drilling multiple holes in the support structure for fastening the strain sensor to the support structure, which may introduce alignment error.

Another conventional bolt-on strain sensor that compensates for measurement error caused by temperature and overcomes some of the problems with using individual bolt-on strain sensors in rosette pattern is disclosed in U.S. Pat. No. 5,734,110 entitled "Temperature Compensated, Easily Installed Bolt-on Strain Sensor." The bolt-on strain sensor includes a sensor body of generally L-shaped configuration having mounting holes formed at the end of each leg of the L-shaped body and a common mounting hole formed at the intersection between the legs. The strain sensor is attached to the support structure using fastening elements that are inserted through each of the mounting holes. A first strain gage is mounted between two of the mounting holes of one of the legs while a second strain gage is mounted between the mounting holes of the other leg. The first strain sensor has an axis of sensitivity extending between the mounting holes of the first leg while the second strain sensing element has an axis of sensitivity extending between the mounting holes of the second leg. This conventional bolt-on strain sensor design reduces problems with misalignment associated with using a pair of individual strain sensors configured in a rosette pattern because the angle between the axes of sensitivity is fixed by the L-shaped configuration of the sensor body. However, using multiple fastening elements to secure the strain sensor to a support structure can produce other measurement errors. For example, a small shift in contact area caused by uneven tightening of the fastening elements can cause significant zero shifts that may exceed one hundred percent.

Therefore, it would be desirable for a strain sensor to be able to compensate for thermal expansion of the support structure that the strain sensor is mounted on. It would also be desirable that such a strain sensor be relatively simple to attach to the support structure so that additional measurement errors are not caused by installation.

SUMMARY OF THE INVENTION

The strain sensor includes a sensor body extending substantially in a plane. The sensor body is substantially symmetric in the plane about a first axis and a second axis that is perpendicular to the first axis. The sensor body includes a plurality of sensor body portions symmetrically spaced apart about the first axis and the second axis with the plurality of sensor body portions interconnected by respective beams. The strain sensor further includes at least one strain sensing element mounted on one of the respective beams.

DETAILED DESCRIPTION OF THE EMBODIMENTS

The various embodiments of the invention are directed toward strain sensors that compensate for thermal strain. Many specific details of certain embodiments of the invention are set forth in the following description and in FIGS. 1 through 7 in order to provide a thorough understanding of such embodiments. One skilled in the art, however, will understand that the invention may have additional embodiments, or that the invention may be practiced without several of the details described in the following description.

Figure 1:
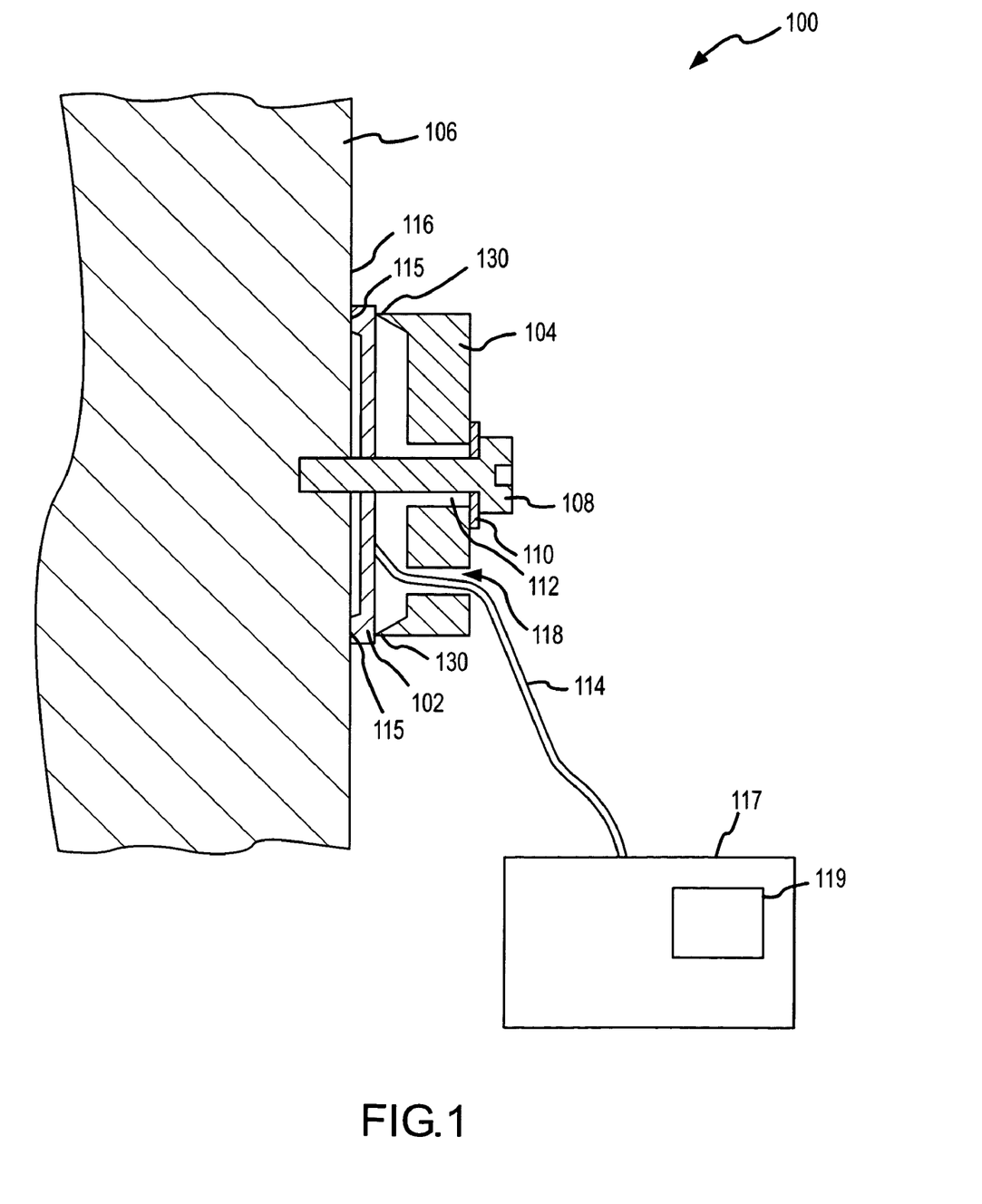
FIG. 1 is a schematic cross-sectional view of a strain sensor according to one embodiment of the invention.
Figure 2:
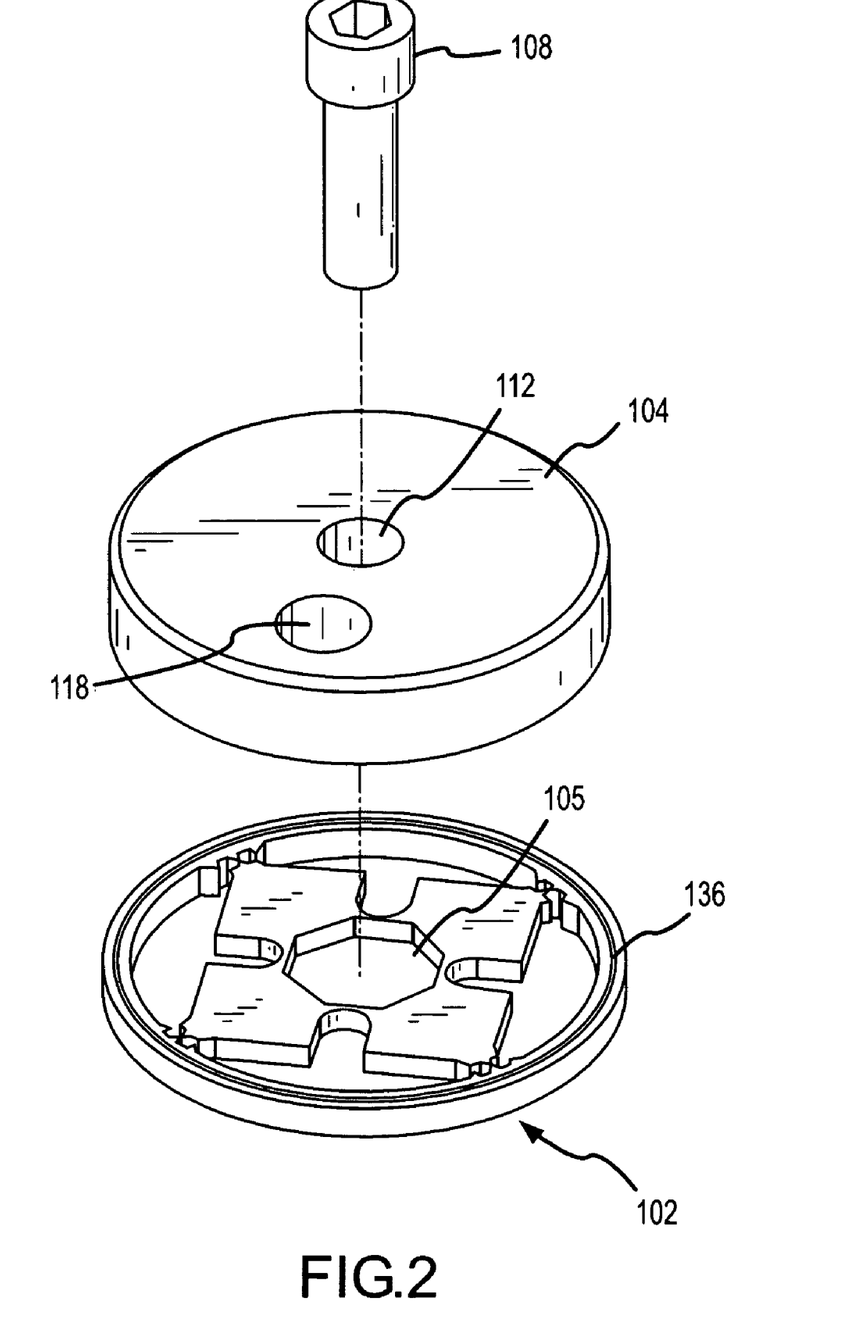
FIG. 2 is a schematic exploded isometric view showing some of the components of the strain sensor of FIG. 1.

FIGS. 1 and 2 are schematic views of a strain sensor 100 configured to compensate for thermal strain experienced by a support structure 106 to which the strain sensor 100 is attached according to one embodiment of the invention. The strain sensor 100 includes a generally planar and circular sensor body 102 that has a plurality of strain sensing elements (not shown) mounted thereon. The strain sensor 100 further includes a mounting cover 104 that sandwiches the sensor body 102 between a surface 116 of the support structure 106 of a vessel (e.g., a silo leg). The mounting cover 104 may be formed from a corrosion resistant material, such as a stainless steel or another suitable material. The sensor body 102 is attached to the support structure 106 using a fastening element 108, such as a threaded bolt or another suitable fastener. The fastening element 108 is sufficiently tightened so that the sensor body 102 deforms with the support structure 106 that it is attached to when the support structure 106 is loaded or undergoes thermal expansion/contraction. Using a single fastening element 108 to attach the strain sensor 100 to the support structure 106 helps prevent installation problems commonly experienced in conventional strain sensors that require multiple fastening elements. These installation problems include, for example, uneven tightening or misalignment of the multiple holes drilled in the support structure 106, which can cause large zero shifts.

The strain sensor 100 is installed on the support structure 106 by inserting the fastening element 108 through a spacer 110 and a hole 112 in the mounting cover 104, and a mounting hole 105 in the sensor body 102. The fastening element 108 is tightened sufficiently so that a peripheral, annular contact portion 130 of the mounting cover 104 firmly bears against the sensor body 102 along its periphery to drive contact surface 115 of the sensor body 102 against the surface 116. Signals generated by the strain sensing elements (not shown) are transmitted through electrical leads 114 that extend through a hole 118 in the cover 104. The electrical leads 114 are coupled to an electronic measurement device 117 of conventional design that is configured for providing the excitation voltage and measuring the output signals generated by the strain sensing elements (not shown). The electronic measurement device 117 further includes a display window 119 of conventional design that provides an indication of the weight of material being held by the vessel supported by the support structure 106. In operation, upon loading/un-loading of the support structure 106 and/or thermal expansion/contraction of the support structure 106 due to temperature changes, the sensor body 102 deforms with the support structure 106, thus, enabling the strain of the support structure 106 to be accurately measured.

Figure 3:
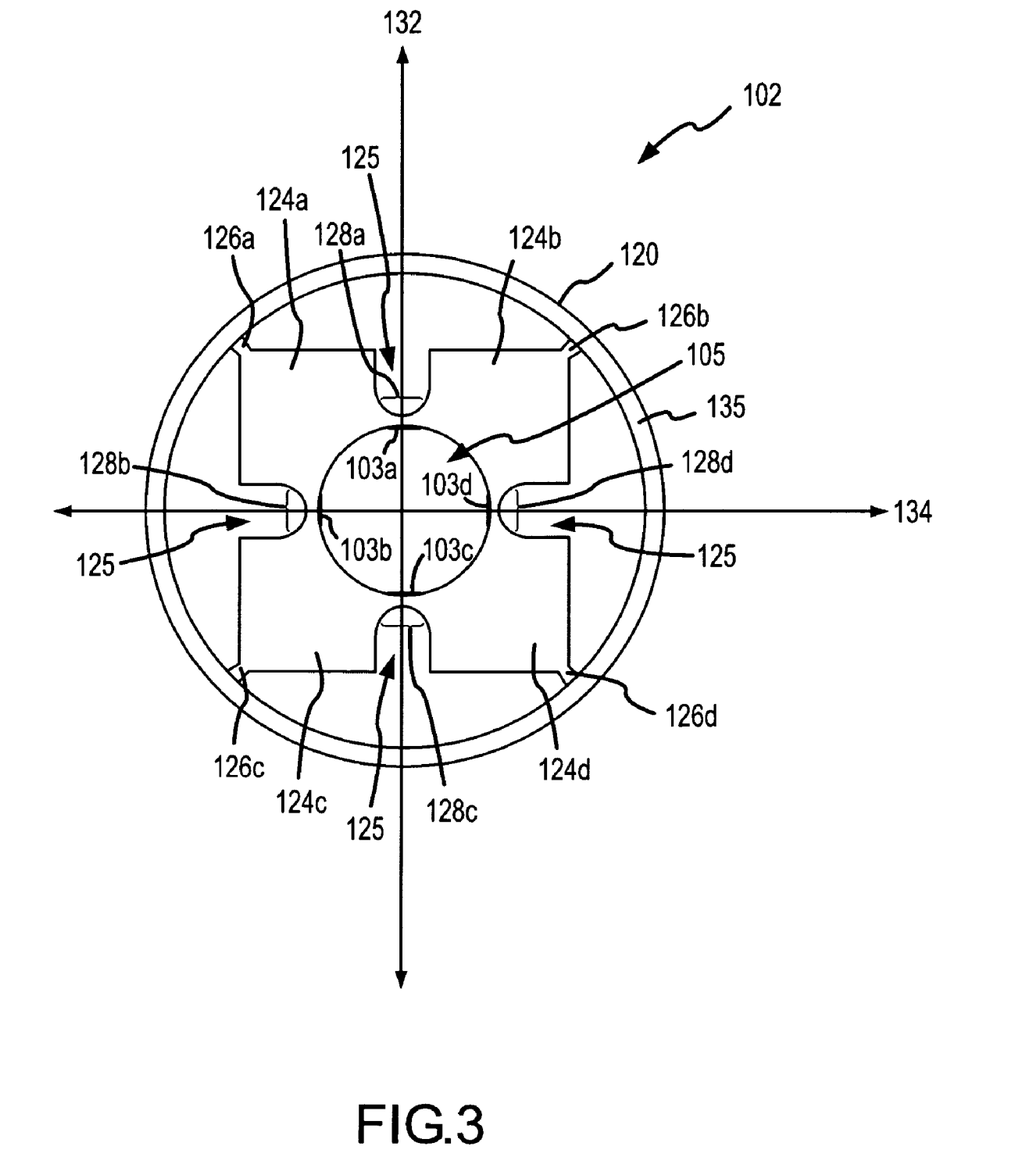
FIG. 3 is a plan view of a sensor body according to one embodiment of the invention.

FIG. 3 shows one embodiment for the sensor body 102. The sensor body 102 extends generally in a plane, and has two mutually perpendicular axes 132 and 134 that lie in the plane. The sensor body 102 is symmetric about each of the axes 132 and 134 lying in the plane of the sensor body 102. The sensor body 102 includes a plurality of sensor body portions 124a-124d that are interconnected to each other through respective beams 128a-128d of equal length, and symmetrically arranged about the axes 132 and 134. The configuration of the beams 128a-128d is defined by the geometry of the centrally located circular mounting hole 105 and the geometry of a plurality of openings 125, all of which extend through the thickness of the sensor body 102. The sensor body 102 further includes a ring 120 connected to respective sensor body portions 124a-124d through corresponding flexible members 126a-126d. The ring 120 may have a thickness greater than the thickness of each of the plurality of sensor body portions 124a-124d so that only the contact surface 115 of the ring 120 (See, FIG. 1) bears against the surface 116 when attached to the support structure 106. The ring 120 is configured so that a surface 135 thereof mates with the opposing peripheral, annular contact portion 130 of the mounting cover 104 when assembled therewith. When installed, one of the axis 132 and 134 is aligned with a principal strain axis of the support structure 106.

Strain sensing elements 103a-103d are attached to the beams 128a-128d, respectively. The strain sensing elements 103a-103d may be conventional strain gages, such as semiconductor strain gages, metal wire strain gages, metal foil strain gages, or a subsequently developed strain gage. Although shown mounted on the interior portions of the beams 128a-128d, the strain sensing elements 103a-103d may be mounted on the opposing side of the beams 128a-128d. The strain sensing elements 103a and 103c are mounted on the sensor body 102 along the axis 132. The strain sensing elements 103b and 103d are mounted on the sensor body 102 along the axis 134. In one embodiment, the strain sensing elements 103a-103d are connected in a half-bridge configuration. In another embodiment, the strain sensing elements 103a-103d are connected in a full-bridge configuration.

Although the sensor body 102 is depicted as having four strain sensing elements 103a-103d, more than or less than four strain sensing elements 103 may be used. In one alternative embodiment, only one strain sensing element 103 is mounted on one of the beams 128a-128d of the sensor body 102.

The sensor body 102 may be fabricated by machining the desired geometry from a thin sheet of metal, such as a corrosion resistant stainless steel, to integrally form the sensor body portions 124a-124d, the beams 128a-128d, the ring 120, and the flexible members 126a-126d from a single piece of material. Representative dimensions for the sensor body 102 are a thickness of about 0.040 to 0.050 inches, and an outer diameter for the ring 120 of about 1.00 inch.

Figure 4:
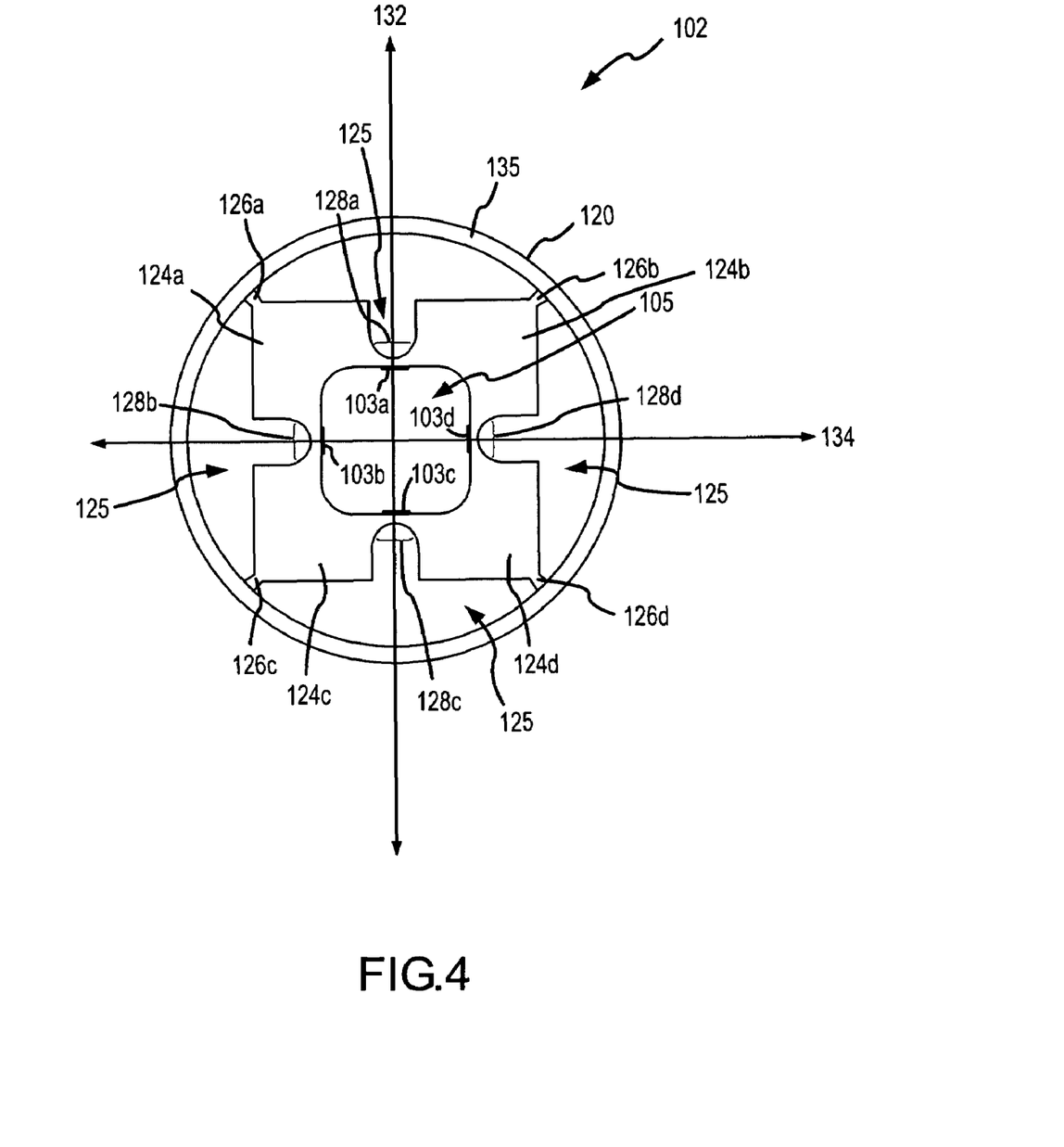
FIG. 4 is a plan view of a sensor body according to an alternative embodiment of the invention.

FIG. 4 shows an alternative embodiment for the sensor body 102 in which the mounting hole 105 has a generally square shaped cross-sectional geometry with rounded comers. This embodiment facilitates applying the strain sensing elements 103a-103d to the flat interior portions of the beams 128a-128d defined, in-part, by the square shaped cross-sectional geometry of the mounting hole 105.

Figure 5:
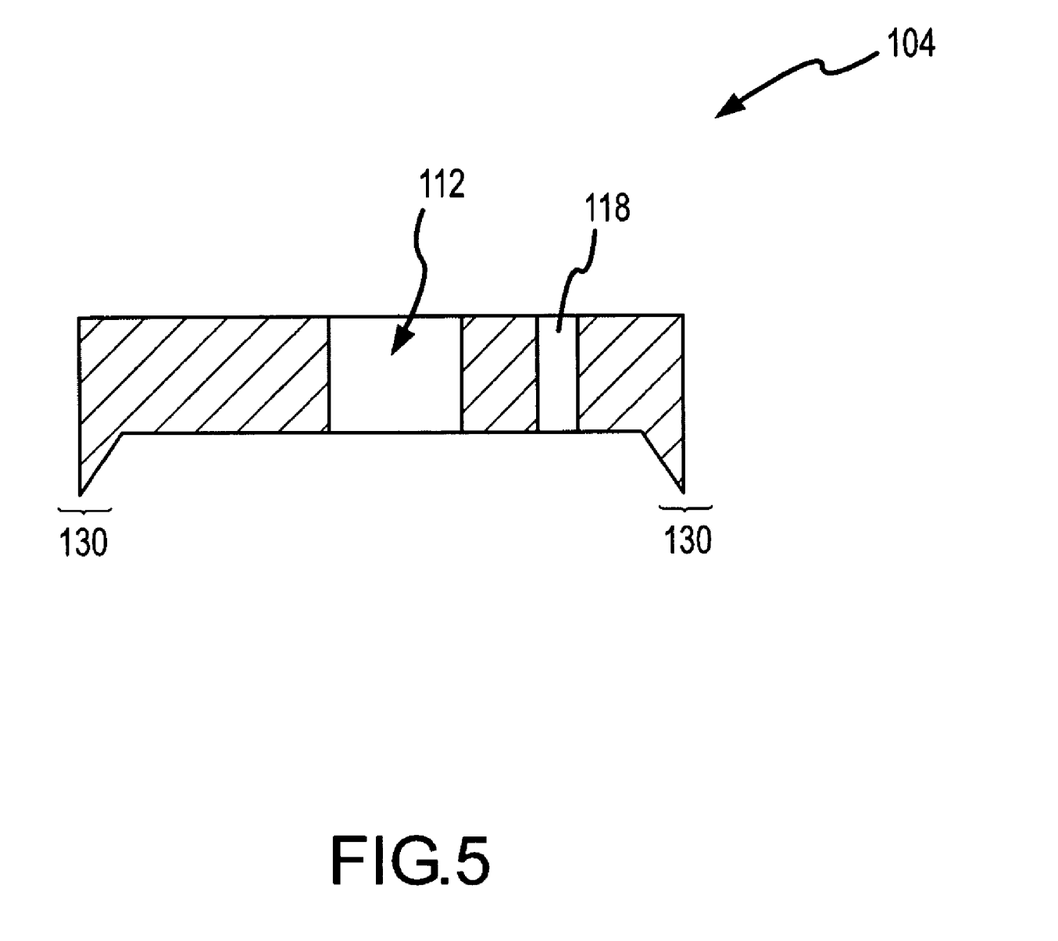
FIG. 5 is a schematic cross-sectional view of the mounting cover of FIG. 1.

FIG. 5 shows the mounting cover 104 of the strain sensor 100. The mounting cover 104 encloses and protects the portion of the sensor body 102 that includes the strain sensing elements 103a-103d and associated electrical components. The mounting cover 104 includes the hole 112 extending through the thickness thereof configured to receive the fastening element 108, and the hole 118 configured to receive the electrical leads 114. The mounting cover 104 further includes the peripheral, annular contact portion 130 that is configured to mate with and bear against the opposing surface 135 of the sensor body 102 upon assembly therewith and tightening of the fastening element 108 on the support structure 106. When the peripheral, annular contact portion 130 of the mounting cover 104 is mated with the opposing surface of the sensor body 102, the hole 112 of the mounting cover 104 and the mounting hole 105 of the sensor body 102 are aligned.

Figure 6:
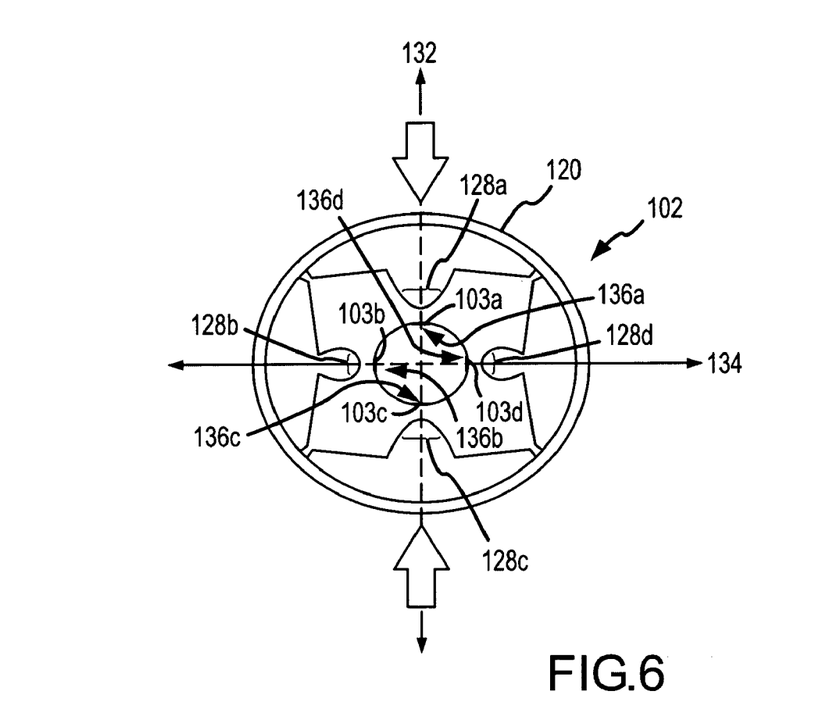
FIG. 6 is a schematic cross-sectional view of the sensor body of FIG. 3 in a deformed state due to axial compressive loading of the support structure to which the strain sensor including the sensor body is attached.
Figure 7:
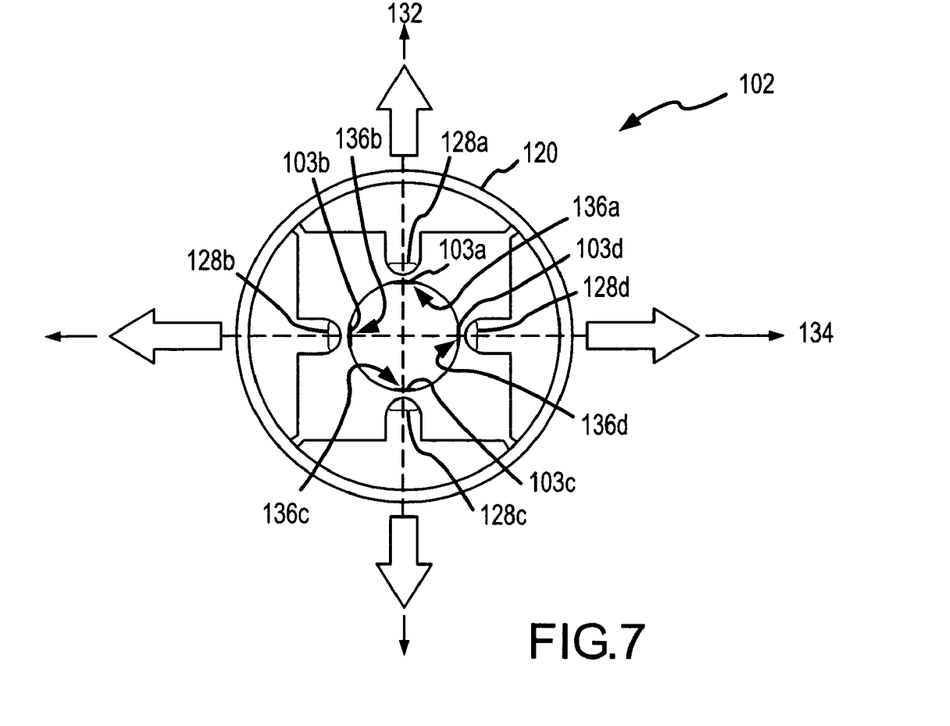
FIG. 7 is a schematic cross-sectional view of the sensor body of FIG. 3 in a deformed state due thermal expansion of the support structure to which the sensor including the sensor body is attached.

FIGS. 6 and 7 show the deformation of the strain sensor 100 under uniaxial loading of the support structure 106 and during thermal expansion of the support structure 106, respectively. In FIGS. 6 and 7, the strain sensor 100 including the sensor body 102 is attached to the support structure 106 with one of the axis 132 and 134 aligned with a principal strain axis of the support structure 106. In FIG. 6, the strain sensor 100 attached to the support structure 106 has undergone deformation due to the support structure 106 being uniaxially compressively loaded generally along the axis 132 of the sensor body 102. The sensor body 102 deforms with the support structure 106 from a circular configuration to an elliptical configuration, thus, reducing the order of rotational symmetry of the sensor body 102 about an axis perpendicular to axes 132 and 134. Each of the beams 128a-128d bend a substantially equal amount. The uniaxial loading bends the beams 128a and 128c so that inner beam surfaces 136a and 136c are under compression and also bends the beams 128b and 128d so that the inner beam surfaces 136b and 136d are under tension. An output signal is generated from the sensor 100 because the beams 128a-128d deform to a sufficient amount so that a corresponding strain sensing element 103a-103d changes resistance. Thus, changing the configuration of the sensor body 102 from circular to elliptical will generate an output signal from the strain sensor 100.

In FIG. 7, the strain sensor 100 attached to the support structure 106 has undergone deformation due to the support structure 106 undergoing thermal expansion. During thermal expansion, the strain of the support structure 106 and the sensor body 102 attached thereto is equal along the first and second axes 132 and 134. Thermal expansion of the support structure 106 causes the beams 128b and 128d to elongate under tension generally along the axis 132 and the beams 128a and 128c to elongate under tension generally along the axis 134. However, the amount of elongation of each of the beams 128a-128d is so small that a small or non-existent signal is generated by the strain sensor 100. The signal generated by the elongation of each of the beams 128a-128d is particularly small when compared to the signal generated by the bending of the beams 128a-128d that occurs during uniaxial loading as shown in FIG. 6. Thus, when the strain sensor 100 experiences combined uniaxially loading as in FIG. 6 and thermal expansion as in FIG. 7, the signal generated by the bending of the beams 128a-128d due to the uniaxial loading overwhelms the signal, if any at all, generated by the elongation of the beams 128a-128d due to thermal expansion. Accordingly, during thermal expansion/contraction, the strain sensor 100 does not generate an output signal because the shape of the sensor body 102 has not changed, and the sensor body 102 exhibits the same order of rotational symmetry about an axis perpendicular to the axes 132 and 134. The sensor body 102 expands, but remains circular after the thermal expansion of the support structure 106. Thus, the strain sensor 100 is sensitive to strain in the support structure 106 due to material being added to the vessel (FIG. 6), but insensitive to strain in the support structure 106 due to thermal expansion (FIG. 7).

Although the invention has been described with reference to the disclosed embodiments, persons skilled in the art will recognize that changes may be made in form and detail without departing from the spirit and scope of the invention. For example, although the disclosed embodiments have been described in conjunction with weighing materials in a vessel, the strain sensors disclosed herein may be used on any type of structure. In addition, many modifications may be made to adapt to a particular situation and the teaching of the invention without departing from the central scope. Therefore, it is intended that the invention not be limited to the particular embodiment disclosed as the best mode contemplated for carrying out the invention, but that the invention include all embodiments falling within the scope of the appended claims.

What is claimed is:

1. A strain sensor for measuring strain in a contact surface, comprising:
    a sensor body extending substantially in a plane, the sensor body being substantially symmetric in the plane about a first axis and a second axis that is perpendicular to the first axis, the sensor body comprising a plurality of sensor body portions symmetrically spaced apart about the first axis, and the second axis, the plurality of sensor body portions being disposed around an inner perimeter and extending outwardly to an outer perimeter circumscribing the plurality of sensor body portions, each of the plurality of sensor body portions being flexibly secured to the contact surface proximate the outer perimeter and being free to move relative to the contact surface proximate the inner perimeter, the plurality of sensor body portions interconnected by respective beams, each beam extending between two adjacent sensor body portions of the plurality of sensor body portions and extending substantially perpendicularly across one of the first and second axes, the beams and plurality of sensor body portions defining a centrally located hole extending completely through the sensor body; and a first strain sensing element mounted on one of the respective beams.

2. The strain sensor of claim 1 wherein the plurality of sensor body portions comprises four sensor body portions, each of the respective beams being of equal length; and further comprising a second, third, and fourth strain sensing element, each of the second, third, and fourth strain sensing elements mounted on one of the respective beams.

3. The strain sensor of claim 1, further comprising a second, third, and fourth strain sensing element, each of the second, third, and fourth strain sensing elements mounted on one of the respective beams.

4. The strain sensor of claim 3 wherein each of the first, second, third, and fourth strain sensing elements is selected from the group consisting of a metal wire strain gage, a metal foil strain gage, and a semiconductor strain gage.

5. The strain sensor of claim 1 wherein the sensor body comprises a ring extending peripherally about the plurality of sensor body portions.

6. The strain sensor of claim 5 wherein each of the plurality of sensor body portions is connected to the ring with a flexible member.

7. The strain sensor of claim 6 wherein the ring is configured to provide a standoff between a surface of a support structure and the sensor body and wherein the ring comprises a contact surface configured to bear against the surface of the support structure.

8. The strain sensor of claim 1 wherein the sensor body comprises a generally circular plate having the centrally located hole extending there-through and four openings substantially symmetrically arranged about the first and second axes extending therethrough, the centrally located hole and the four openings defining the plurality of sensor body portions that are interconnected by the respective beams.

9. The strain sensor of claim 1, further comprising:

a mounting cover having a peripheral contact surface configured to mate with an opposing peripheral contact surface of the sensor body; and a fastening element configured to be inserted through a hole of the mounting cover and a mounting hole of the sensor body.

10. The strain sensor of claim 1 wherein the sensor body comprises a centrally located mounting hole.

11. The strain sensor of claim 1 wherein each of the respective beams deform longitudinally a substantially equal amount responsive to thermal expansion or contraction of the sensor body.

12. The strain sensor of claim 1 wherein each of the respective beams bend a substantially equal amount responsive to a uniaxial load along one of the first axis and the second axis.

13. The strain sensor of claim 1 wherein the first strain sensing element is selected from the group consisting of a metal wire strain gage, a metal foil strain gage, and a semiconductor strain gage.

14. A weighing system adapted for providing an indication of the weight of material loading a support structure having a contact surface, comprising:

a sensor body comprising a thin metal layer extending substantially in a plane and having a mounting hole extending therethrough, the sensor body being substantially symmetric in the plane about a first axis and a second axis that is perpendicular to the first axis, the sensor body comprising a plurality of sensor body portions symmetrically spaced apart about the first axis and the second axis, the plurality of sensor body portions being disposed around an inner perimeter and extending outwardly to an outer perimeter circumscribing the plurality of sensor body portions, each of the plurality of sensor body portions being flexibly secured to the contact surface proximate the outer perimeter and being free to move relative to the contact surface proximate the inner perimeter, the plurality of sensor body portions each connected to adjacent sensor body portions by respective beams extending substantially perpendicularly across the first or second axis; and a first strain sensing element mounted on one of the respective beams;

a fastening element configured to be inserted through the mounting hole to secure the sensor body to the support structure so that the first axis or the second axis is substantially aligned with a principal strain axis of the support structure; and an electronic indicator coupled to the first strain sensing element, the electronic indicator providing the indication of the weight of material loading the support structure responsive to electrical signals received from the first strain sensing element.

15. The weighing system of claim 14 wherein the plurality of sensor body portions comprises four sensor body portions, each of the four sensor body portions connected to an adjacent sensor body portion with one of the respective beams, each of the respective beams being of equal length; and further comprising a second, third, and fourth strain sensing element coupled to the electronic indicator, each of the second, third, and fourth strain sensing elements mounted on one of the respective beams.

16. The weighing system of claim 14, further comprising a second, third, and fourth strain sensing element coupled to the electronic indicator, each of the second, third, and fourth strain sensing elements mounted on one of the respective beams.

17. The weighing system of claim 16 wherein each of the first, second, third, and fourth strain sensing elements is selected from the group consisting of a metal wire strain gage, a metal foil strain gage, and a semiconductor strain gage.

18. The weighing system of claim 16 wherein the first, second, third, and fourth strain sensing elements are electrically connected in a full-bridge configuration.

19. The weighing system of claim 14 wherein the sensor body comprises a ring extending peripherally about the plurality of sensor body portions.

20. The weighing system of claim 19 wherein the ring is configured to provide a standoff between a surface of a support structure and wherein the ring comprises a contact surface configured to bear against the surface of the support structure.

21. The weighing system of claim 14 wherein the sensor body comprises a generally circular plate having a centrally located hole extending therethrough and four openings substantially symmetrically arranged about the first and second axes extending therethrough, the centrally located hole and the four openings defining the plurality of sensor body portions that are interconnected by the respective beams.

22. The weighing system of claim 14, further comprising:
a mounting cover having a hole extending therethrough configured to receive the fastening element and a peripheral contact surface configured to mate with an opposing peripheral contact surface of the sensor body.

23. The weighing system of claim 14 wherein the sensor body comprises a centrally located mounting hole.

24. The weighing system of claim 14 wherein each of the respective beams deform longitudinally a substantially equal amount responsive to thermal expansion or contraction of the sensor body.

25. The weighing system of claim 14 wherein each of the respective beams bend a substantially equal amount responsive to a uniaxial load along one of the first axis and the second axis.

26. The weighing system of claim 14 wherein the first strain sensing element is selected from the group consisting of a metal wire strain gage, a metal foil strain gage, and a semiconductor strain gage.

27. The weighing system of claim 14, further comprising a second strain sensing element and wherein the first and second strain sensing elements are electrically connected in a half-bridge configuration.

28. A weighing system adapted for providing an indication of the weight of material loading a support structure, comprising:

a sensor body extending substantially in a plane and having a mounting hole extending therethrough, the sensor body being substantially symmetric in the plane about a first axis and a second axis that is perpendicular to the first axis, the sensor body comprising a plurality of sensor body portions symmetrically spaced apart about the first axis and the second axis, the plurality of sensor body portions interconnected by respective beams; and a first strain sensing element mounted on one of the respective beams;

a fastening element configured to be inserted through the mounting hole to secure the sensor body to the support structure so that the first axis or the second axis is substantially aligned with a principal strain axis of the support structure; and an electronic indicator coupled to the first strain sensing element, the electronic indicator providing the indication of the weight of material loading the support structure responsive to electrical signals received from the first strain sensing element;

wherein the sensor body comprises a ring extending peripherally about the plurality of sensor body portions; and wherein each of the plurality of sensor body portions is connected to the ring with a flexible member.

* * * * *